Feb. 19, 1929.
J. F. TRIBBLE
1,702,553
COMBINED REAR BUMPER AND LUGGAGE CARRIER
Original Filed Sept. 26, 1927   2 Sheets-Sheet 2

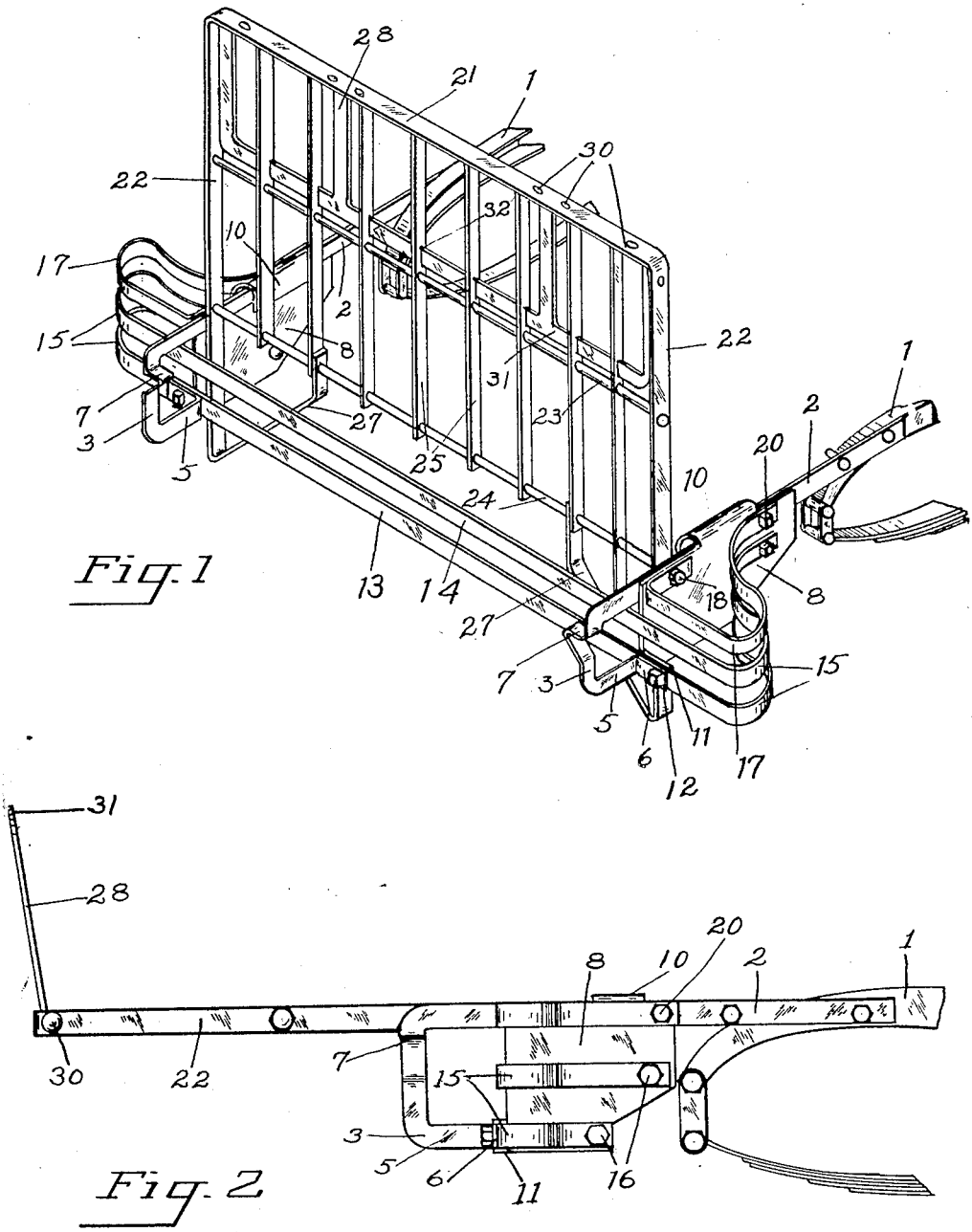

Inventor:—
John F. Tribble.
By his Attorney:— Horace Barnes

Patented Feb. 19, 1929.

1,702,553

UNITED STATES PATENT OFFICE.

JOHN F. TRIBBLE, OF PORTLAND, OREGON.

COMBINED REAR BUMPER AND LUGGAGE CARRIER.

Application filed September 26, 1927, Serial No. 221,972. Renewed January 8, 1929.

This invention relates to improvements in combined rear bumpers and luggage carriers for automobiles.

The object of the invention is to provide a rear bumper for an automobile, of simple and practical construction, affording efficient protection to the rear of the car from collision, together with a folding luggage carrier pivotally mounted therein affording strong and serviceable support for the carriage of luggage on the car and adapted, when not in use, to be folded compactly against the rear of the car.

A further object of the invention is the provision in a combination rear bumper and luggage carrier of means for pivotally connecting the luggage carrier to the bumper frame and supporting devices for the carrier upon said frame when the carrier is in lowered operative condition, whereby the load carried upon said carrier is borne upon said supports and with the removal of all strains upon said pivotal connection.

A still further object of the invention is the provision in a luggage carrier of the type described of a foldable rear guard adapted, when in use, to afford protection against the loss or misplacement of the miscellaneous load upon the carrier, such as camp equipment, and, when folded, is adapted to lie below the plane of the supporting surface of the carrier, so that it will not interfere with the service of the carrier in the support of flat objects, such as trunks and the like.

Other objects and advantages of my invention, and objects relating to details of construction and arrangement of parts, will be readily apparent in the course of the detailed description to follow.

The accompanying drawings illustrate by way of example one form in which my invention may be embodied, wherein:

Figure 1 is a perspective view of an embodiment of my invention shown attached in folded condition upon the frame of an automobile.

Fig. 2 is a view in side elevation of the same shown in operative position.

Figure 4:
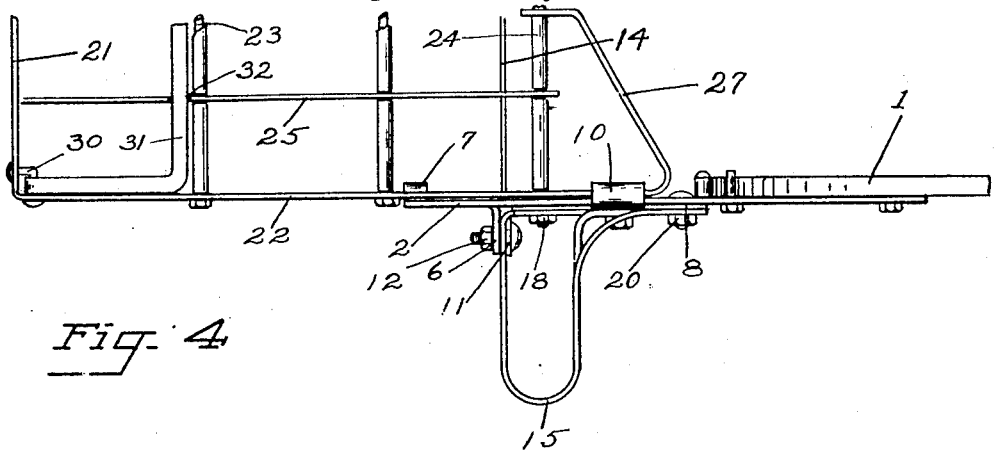
Fig. 4 is a fragmentary plan view of the invention as shown in Fig. 2 with the guard rail folded.
Figure 3:
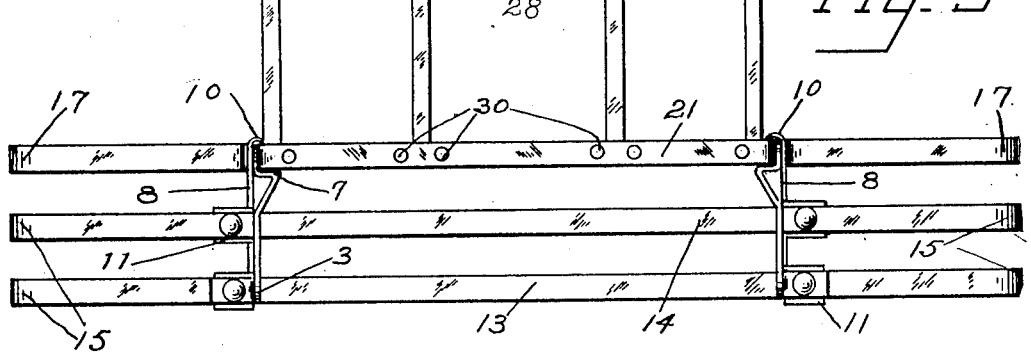
Fig. 3 is a view in rear elevation of the invention as shown in Fig. 2.
Figure 5:
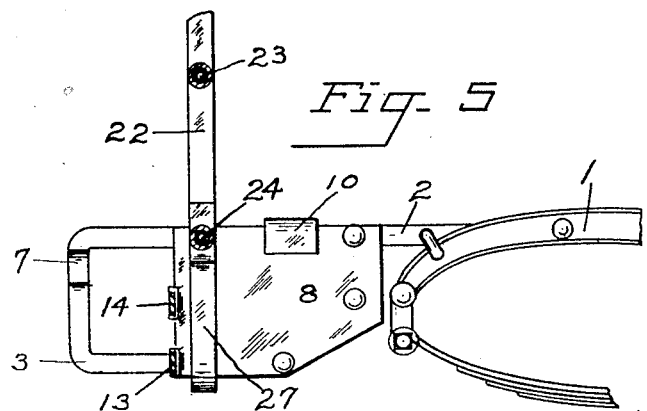
Fig. 5 is a fragmentary view in cross section through my improved luggage carrier in its folded condition.

Referring to said views, the reference numerals 1 indicate the longitudinal frames of an automobile to which or to any other convenient or suitable part of the car my devices may be attached. A supporting bracket member is rigidly connected to each of said frames, each consisting in a horizontally disposed bar 2 extending downwardly, as at 3, at its rearmost extremity and again directed forwardly, at 5, in parallel with the bar portion 2 and terminating in a flange 6 directed transversely of the car and at right angles to the portion 5. The portion 3 of said bracket is formed with an inwardly directed ledge 7 substantially in the plane of the lower edge of the bar portion 2, serving as an outermost support for the luggage carrier, as will be hereinafter described.

8 indicates a vertically disposed plate fixedly connected to the outer side of the bar 2. Each side plate is formed with a flange portion 10 hooked over the bar 2 and extending downwardly on the inner side of said bar to be engaged by the luggage carrier when in lowered position, as will be hereinafter more fully described. Each side plate 8 is further formed with a rectangularly directed lug 11 in opposed relation to the flange 6 of the bracket and to which the bracket is secured by a bolt 12.

Parallel steel bumper bars 13 and 14 are positioned to extend horizontally across the rear of the car in vertical alignment, at each side for a distance beyond the supporting bracket to provide protection for the rear fenders and wheels from collision, said bars being given bends 15 directed inwardly and forwardly of the car to their extremities, which are rigidly secured to the respective plates 8 by bolts 16. The lower bar 13 is preferably further secured between the flanges 6 and the lugs 11 upon each side.

A supplementary spring 17 is formed in the same configuration as the extremities of the bars 13 and 14 therebelow, its ends being secured at 18 and 20 to the plates 8.

The luggage carrier consists in a plane grille-like structure having an external frame bar extending integrally about its rear portion 21 and its opposite sides 22. Transverse rods 23 and 24 are rigidly arranged between the side frame bars 22, on which metal slats 25 are mounted in parallel relation with said side frame bars and are connected at their rear extremities to the frame bar portion 21. Cylindrical spacing tubes are mounted upon the rods 25 to maintain the slats in position. The rod 24 is extended through the side frame bars and through the respective plates 8 at its opposite ends, forming a pivotal connection for the luggage carrier upon the bumper brackets. Said pivotal connection is desirably about midway between the ledge 7 and the hook flange 10, and the length of the side frame bars 22 of the luggage carrier forwardly of said pivotal connection is sufficient to extend beyond the hook flanges 10. Desirably the side frame bars may each be extended integrally at an angle from the innermost extremity, as at 27, to engage and be secured to the rod 24 to provide an angular brace at each side of the luggage carrier.

A luggage guard 28 is provided at the rear end of the luggage carrier consisting in a metal grating hingedly connected at 30 to the inner side of the rear frame bar 21 and including a top rail 31 parallel with the bar 21. Said luggage guard is mounted to bear in slightly rearwardly inclined relation upon said rear frame bar when extending upwardly in operative position, as indicated in Fig. 2, and may be folded inwardly to lie below the plane of the upper edges of the slats 25 through the provision of slots 32 formed in said slats adjacent the transverse rod 23 within which the rail 31 is received.

The operation of my invention may be readily and briefly described as follows.

When not in use, the luggage carrier may be swung upwardly, as indicated in Fig. 1, so that it will lie closely to the rear of the car body. In this position the luggage guard is folded upon the carrier, as shown in said view. In this position the bumper bars are exposed to their fullest extent to protect the rear of the car and the luggage carrier from damage by rear-end collision.

When it is desired to utilize the luggage carrier, it is swung downwardly into the position indicated in Figs. 2 and 4, wherein it will be seen that the carrier is extended rearwardly of the car for a considerable distance to afford a relatively large area upon which the luggage may be mounted. Rearwardly of the pivotal connection of the carrier in the brackets the side frame bars 22 will rest upon the ledges 7 and forwardly of said pivotal connections the frame bars will engage within the hook flanges 10 bearing thereon in upward directions, due to the overhanging position of the luggage carrier. The positions of such supports 7 and 10 relative to the pivotal connections of the carrier upon the brackets is such that, when a weight is supported on the carrier, the strain thereof will be removed from said pivotal connections and be borne at the points of connection with the brackets upon each side.

With the luggage carrier in use, the spring bent portions 15 of the bumper bars are fully operative to protect the rear fenders and wheels from damage by rear collision. It is apparent that the luggage guard mounted upon the rear of the luggage carrier will provide a useful auxiliary device in the protection of miscellaneous luggage that may be carried upon the car, such as camp outfits and the like, and may be folded below the plane of the carrying surface of the luggage carrier to admit an unimpeded plane surface for the support of boxes, trunks, and the like, when desired.

From the foregoing description, taken in connection with the accompanying drawings, the advantages of the construction and application of my improved combined rear bumper and luggage carrier will be readily apparent; but, while I have described the principle of operation of the invention, together with the devices which I now consider the best embodiment thereof, it will be understood that the structures shown are merely illustrative and that such changes may be made therein as will lie within the scope of the following claims.

Having described my invention, what I claim, is:

1. In a combination bumper and luggage carrier, a pair of brackets, a plurality of spring bumper-bars secured to said brackets, said brackets extending rearwardly beyond said bars and provided with a ledge support for a luggage carrier, a grille platform constituting a luggage carrier pivotally mounted in said brackets and having a side bar at each side extending forwardly of said pivotal connection, and means upon said brackets to engage said bars when the luggage carrier is in its lowered operative position.

2. In a combination bumper and luggage carrier, a pair of brackets, a plurality of spring bumper bars, secured to said brackets, said brackets extending rearwardly beyond said bars and provided with a ledge support for a luggage carrier, a grille platform constituting a luggage carrier pivotally mounted in said brackets and having a side bar at each side extending forwardly of said pivotal connection, means upon said brackets to engage said bars when the luggage carrier is in its lowered operative position, and an angle brace extending from the forward extremity of each bar.

3. In a combination bumper and luggage carrier, a pair of brackets, a plurality of spring bumper bars secured to said brackets, said brackets extending rearwardly beyond said bars and provided with a ledge support for a luggage carrier, a grille platform constituting a luggage carrier pivotally mounted in said brackets and having a side bar at each side extending forwardly of said pivotal connection, means upon said brackets to engage said bars when the luggage carrier is in its lowered operative position, and a rear guard pivotally mounted upon the rear edge of said luggage carrier.

4. In a combination bumper and luggage carrier, a pair of brackets, a plurality of spring bumper bars secured to said brackets, said brackets extending rearwardly beyond said bars and provided with a ledge support for a luggage carrier, a grille platform constituting a luggage carrier pivotally mounted in said brackets and having a side bar at each side extending forwardly of said pivotal connection, means upon said brackets to engage said bars when the luggage carrier is in its lowered operative position, and a rear guard pivotally mounted upon the rear edge of said luggage carrier adapted to be folded below the carrying surface of the carrier.

5. In a combination bumper and luggage carrier, a pair of brackets, a plurality of spring bumper bars secured to said brackets, said brackets extending rearwardly beyond said bars and provided with a ledge support for a luggage carrier, a grille platform constituting a luggage carrier pivotally mounted in said brackets and having a side bar at each side extending forwardly of said pivotal connections, means upon said brackets to engage said bars when the luggage carrier is in its lowered operative position, an angle brace extending from the forward extremity of each bar, and a rear guard pivotally mounted upon the rear edge of said luggage carrier.

6. In a combination bumper and luggage carrier, a pair of brackets, a plurality of spring bumper bars secured to said brackets, said brackets extending rearwardly beyond said bars and provided with a ledge support for a luggage carrier, a grille platform constituting a luggage carrier pivotally mounted in said brackets and having a side bar at each side extending forwardly of said pivotal connections, means upon said brackets to engage said bars when the luggage carrier is in its lowered operative position, an angle brace extending from the forward extremity of each bar, and a rear guard pivotally mounted upon the rear edge of said luggage carrier adapted to be folded below the carrying surface of the carrier.

7. The combination with a rear bumper for an automobile including a pair of supporting brackets each having a supporting ledge at its outer extremity and a hooked flange intermediate its length, of a luggage carrier pivotally mounted upon each side substantially midway between said ledge and said flange and adapted to bear downwardly and upwardly thereagainst, respectively.

8. A luggage carrier formed of a rectangular frame comprising side bars, and an integrally connected rear bar, transversely disposed spaced rods arranged between said side bars, spaced slats mounted on said rods and secured to said rear bar, and devices on said rods to space said slats apart.

9. A luggage carrier formed of a rectangular frame comprising side bars, and an integrally connected rear bar, transversely disposed spaced rods arranged between said side bars, spaced slats mounted on said rods and secured to said rear bar, means on said rods to space said slats apart, and brackets fixedly secured upon opposite sides of an automobile, one of said rods being pivotally mounted in said brackets.

10. A luggage carrier formed of a rectangular frame comprising side bars, and an integrally connected rear bar, transversely disposed spaced rods arranged between said side bars, spaced slats mounted on said rods and secured to said rear bar, means on said rods to space said slats apart, and brackets fixedly secured upon opposite sides of an automobile, one of said rods being pivotally mounted in said brackets, said brackets each having means upon opposite sides of said pivotal connections for supporting the carrier in its lowered operative position.

11. A luggage carrier formed of a rectangular frame comprising side bars, and an integrally connected rear bar, transversely disposed spaced rods arranged between said side bars, spaced slats mounted on said rods and secured to said rear bar, means on said rods to space said slats apart, and a rear guard pivotally connected to said rear bar and adapted to bear thereagainst in operative position and to be folded inwardly below the plane of said slats.

12. A luggage carrier formed of a rectangular frame comprising side bars, and an integrally connected rear bar, transversely disposed spaced rods arranged between said side bars, spaced slats mounted on said rods and secured to said rear bar, and means on said rods to space said slats apart, said side bars being extended forwardly of said pivotal connection and directed angularly to a connection with one of said rods to provide angle braces.

13. A luggage carrier formed of a rectangular frame comprising side bars, and an integrally connected rear bar, transversely disposed spaced rods arranged between said side bars, spaced slats mounted on said rods and secured to said rear bar, means on said rods to space said slats apart, and brackets fixedly secured upon opposite sides of an automobile, one of said rods being pivotally mounted in said brackets, said side bars being extended forwardly of said pivotal connection and directed angularly to a connection with one of said rods to provide angle braces.

14. A luggage carrier formed of a rectangular frame comprising side bars, and an integrally connected rear bar, transversely disposed spaced rods arranged between said side bars, spaced slats mounted on said rods and secured to said rear bar, means on said rods to space said slats apart, and brackets fixedly secured upon opposite sides of an automobile, one of said rods being pivotally mounted in said brackets, said brackets each having means upon opposite sides of said pivotal connection for supporting the carrier in its lowered operative position, said side bars being extended forwardly of said pivotal connection and directed angularly to a connection with one of said rods to provide angle braces.

15. A luggage carrier formed of a rectangular frame comprising side bars, and an integrally connected rear bar, transversely disposed spaced rods arranged between said side bars, spaced slats mounted on said rods and secured to said rear bar, means on said rods to space said slats apart, a rear guard pivotally connected to said rear bar and adapted to bear thereagainst in operative position and to be folded inwardly below the plane of said slats, and brackets fixedly secured upon opposite sides of an automobile, one of said rods being pivotally mounted in said brackets, said side bars being extended forwardly of said pivotal connection and directed angularly to a connection with one of said rods to provide angle braces.

16. A luggage carrier formed of a rectangular frame comprising side bars, and an integrally connected rear bar, transversely disposed spaced rods arranged between said side bars, spaced slats mounted on said rods and secured to said rear bar, means on said rods to space said slats apart, a rear guard pivotally connected to said rear bar and adapted to bear thereagainst in operative position and to be folded inwardly below the plane of said slats, and brackets fixedly secured upon opposite sides of an automobile, one of said rods being pivotally mounted in said brackets, said brackets each having means upon opposite sides of said pivotal connection for supporting the carrier in its lowered operative position, said side bars being extended forwardly of said pivotal connection and directed angularly to a connection with one of said rods to provide angle braces.

JOHN F. TRIBBLE.